United States Patent [19]
Iketani

[11] Patent Number: 5,350,995
[45] Date of Patent: Sep. 27, 1994

[54] BATTERY CHARGER FOR CHARGING BOTH A FREQUENTLY AND INFREQUENTLY USED BATTERY

[75] Inventor: Kouhei Iketani, Tokyo, Japan

[73] Assignee: Asahi Kogaku Kogyo Kabushiki Kaisha, Tokyo, Japan

[21] Appl. No.: 91,046

[22] Filed: Jul. 14, 1993

[30] Foreign Application Priority Data

Jul. 17, 1992 [JP] Japan .................. 4-212329

[51] Int. Cl.⁵ ............................................. H02J 7/04
[52] U.S. Cl. ......................................... 320/15; 320/20
[58] Field of Search ................. 320/20, 21, 22, 23, 320/24, 5, 6, 15, 31, 32, 39, 40

[56] References Cited

U.S. PATENT DOCUMENTS

| | | | |
|---|---|---|---|
| 4,114,176 | 9/1978 | Kawasaki | 354/289 |
| 4,354,148 | 10/1982 | Tada et al. | 320/20 |
| 4,843,299 | 6/1989 | Hutchings | 320/31 |
| 4,920,307 | 4/1990 | Iketani | 320/40 X |
| 5,180,961 | 1/1993 | Tsujino | 320/20 |
| 5,206,579 | 4/1993 | Kawate et al. | 320/20 |
| 5,229,705 | 7/1993 | Kato | 320/20 |

FOREIGN PATENT DOCUMENTS

| | | | |
|---|---|---|---|
| 0399821 | 11/1990 | European Pat. Off. | 320/20 |
| 4088836 | 3/1992 | Japan | 320/20 |
| 4248330 | 9/1992 | Japan | 320/15 |

OTHER PUBLICATIONS

CQ Shuppan K.K., "Transistor Technology Supplement Hardware Design Series", pp. 130–135, published Jun. 1, 1992 and English language translation.

*Primary Examiner*—Kristine L. Peckman
*Attorney, Agent, or Firm*—Sandler, Greenblum & Bernstein

[57] ABSTRACT

A battery charger used to charge a battery has a voltage detector for detecting a voltage across a battery, a memory for storing detected voltage values, and a comparator for comparing a presently detected voltage with a previously stored voltage. If the detected voltage decreases below a certain value before a predetermined period of time elapses, it is determined that a battery that has been in storage for a long period of time is connected to the battery charger. The battery charger will then apply a constant current to the battery until a second predetermined period of time has elapsed.

11 Claims, 4 Drawing Sheets

Fig — 1
PRIOR ART

BATTERY CHARGER FOR CHARGING BOTH A FREQUENTLY AND INFREQUENTLY USED BATTERY

FIELD OF THE INVENTION

The present invention relates to a device for charging a battery, and more particularly, to a battery charger for fully charging a battery which has been in storage for a long period of time, i.e., which has not been in use for a long period of time.

BACKGROUND OF THE INVENTION

One quick-charge battery charger that has been proposed in recent years detects a voltage drop across a battery being charged to control a charging current in a final charging stage after the battery has been charged at a relatively high current rate. More specifically, as shown in FIG. 1 of the accompanying drawings, while a battery (more particularly a nickel-cadmium battery) is being charged by a battery charger, a constant charging current is supplied to the battery, resulting in the voltage across the battery progressively increasing with time. In the final charging stage, the voltage across the nickel-cadmium battery reaches a peak value Vp, and then drops by $-\Delta V$ from the peak value Vp. When the voltage drop $-\Delta V$ is detected, the charging current is cut off to prevent the nickel-cadmium battery from being excessively charged. After the quick charging current has been cut off, the nickel-cadmium battery is continuously trickle charged with a low current in order to keep the battery fully charged.

Detecting the voltage drop $-\Delta V$ is an effective way of determining when the charging of the battery is completed, because the voltage drop $-\Delta V$ occurs regardless of the discharge rate or ambient temperature of the nickel-cadmium battery.

It is known that a nickel-cadmium battery which has not been in use (i.e., which has been in storage for a long period of time), has its charging capacity reduced because of the inactive state that develops when the battery is stored for a long time. A battery that has been in storage for a long period of time will hereinafter be referred to as a long storage battery. A battery that has been used frequently will hereinafter be referred to as a frequently used battery.

When a long storage battery is charged, a voltage peak called a pseudo voltage peak, is developed prior to the voltage peak, at completion of the charging process. A voltage drop immediately following such a pseudo actual voltage peak at the completion of the charging of the battery. If the charging current supplied to charge a long storage battery is cut off when the voltage drop subsequent to such a pseudo voltage peak is detected, the battery would not be fully charged.

SUMMARY OF THE INVENTION

It is therefore an object of the present invention to provide a battery charger capable of fully charging both a long storage battery and a frequently used battery.

According to the present invention, there is provided a battery charger for charging a battery comprising:
  detector means for detecting a voltage across the battery;
  determining means for determining whether the battery has been frequently used or has been in long storage, based upon a variation in the voltage detected by the detector means during a predetermined time period after the battery starts charging; and
  charge control means for charging the battery with a first predetermined charging routine if the battery has been frequently used, and charging the battery with a second predetermined charging routine if the battery has been in long storage.

Thus, according to the present invention, when a battery is first connected to the battery charger, the voltage across the battery terminals is detected. If the voltage continuously decreases below a certain value before a predetermined time has elapsed, it is determined that a long storage battery is connected to the battery charger. The battery is then charged with a constant current until another predetermined time has elapsed. Afterwards, the current controller is de-energized. The battery is then trickle charged using a well known trickle method, not described here.

If the voltage detected does not decrease below a certain value during the predetermined time period, it is determined that a frequently used battery is connected to the battery charger. The battery is then charged with a constant current until the voltage detected across the terminals has decreased by a predetermined value with respect to the maximum voltage detected during the charging routine. The current controller is de-energized and the battery is then trickled charged. This is known as the negative $\Delta V$ detection method, and is well known In the prior art.

DESCRIPTION OF THE ACCOMPANYING DRAWINGS

DESCRIPTION OF THE EMBODIMENTS

Figure 2:
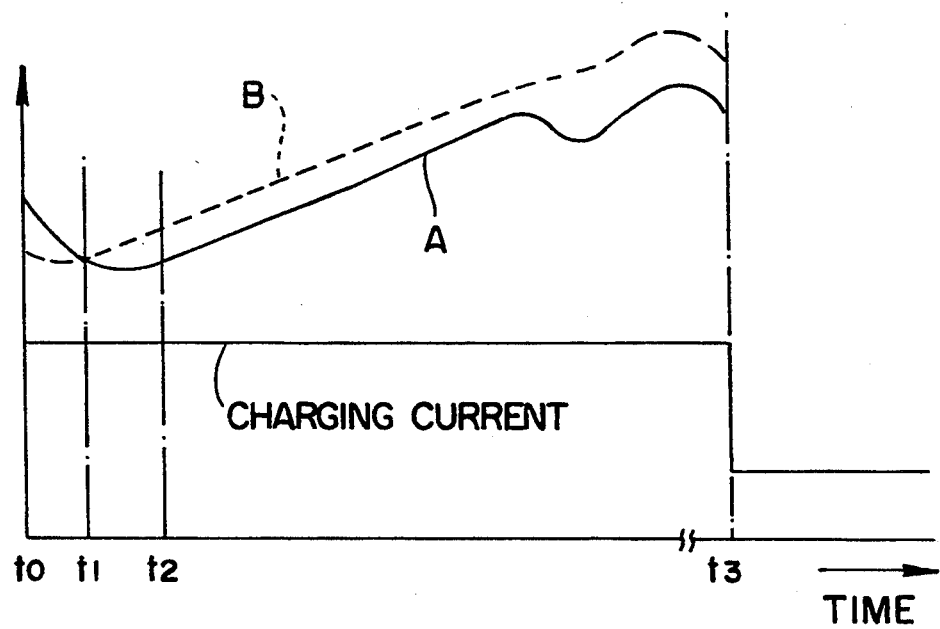
FIG. 2 is a diagram showing voltages developed across different batteries during charging, one of which has been used frequently and one of which has not been used for a long period of time.

As shown in FIG. 2, when a frequently used battery and a long storage battery are charged, the voltages across these batteries vary with time. Curve A represents the voltage across the long storage battery which is being charged. Curve B represents the voltage across the frequently used battery which is being charged. As indicated by curve A, the voltage across the long storage battery temporarily drops in an initial charging stage, then gradually increases up to a pseudo voltage peak, followed by a voltage drop, and finally fails at the end of the charging process. The temporary voltage drop in the initial charging stage generally occurs during a time t1, but may extend to a time t2.

However, as indicated by curve B, the voltage across the frequently used battery remains approximately the same during the initial charging stage, and has no pseudo voltage peak before the end of the charging process.

Figure 3:
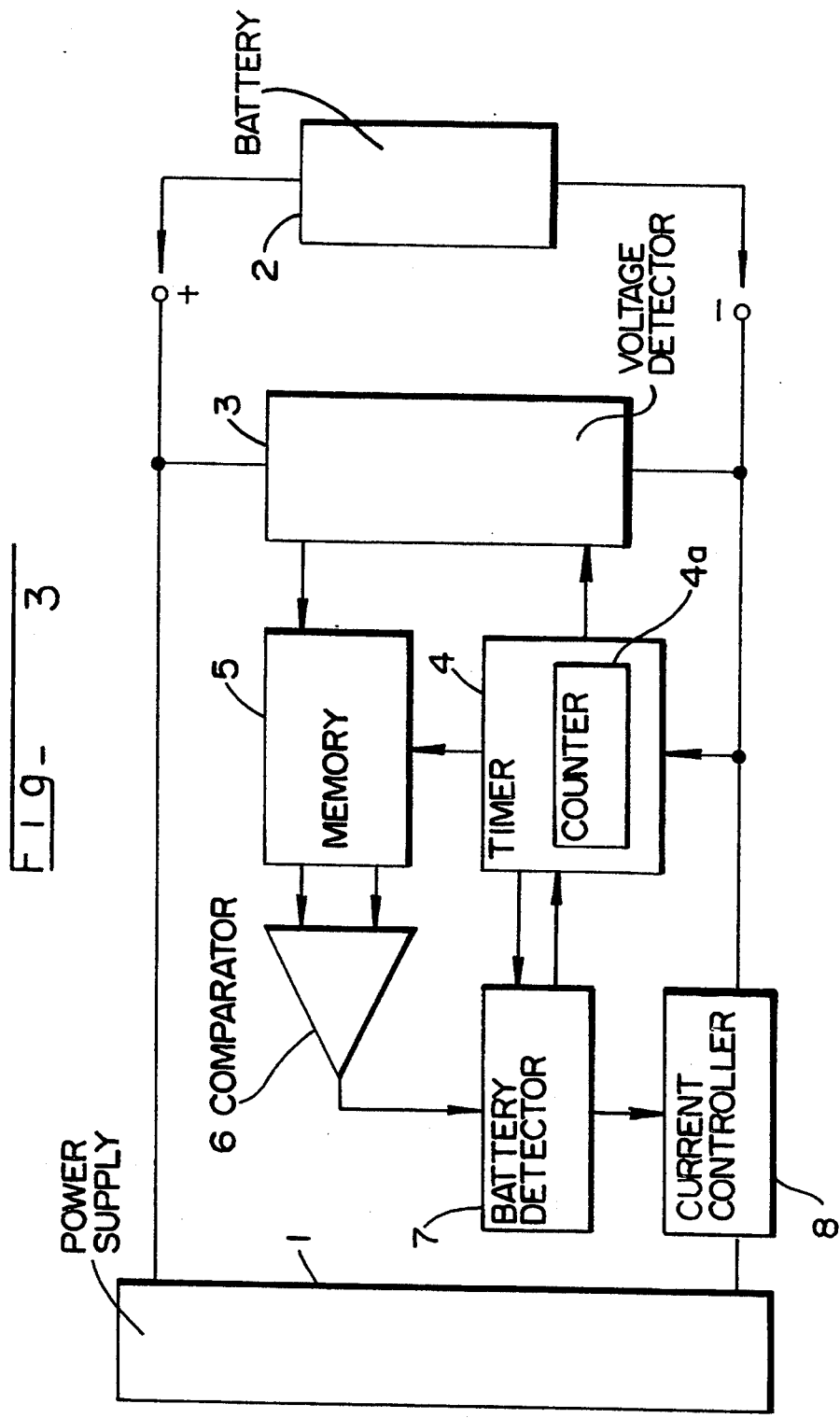
FIG. 3 is a block diagram of a battery charger according to the present invention.

A battery charger according to the present invention, as shown in FIG. 3, includes a power supply 1 for supplying a constant charging current to a battery 2. The battery charger has a voltage detector 3 for periodically detecting the voltage across the battery 2 under the control of a timer 4. The timer 4 has a built-in counter 4a for counting the number of times that the voltage detector 3 has detected the voltage across the battery 2. The voltage detected by the voltage detector 3 is stored in a memory 5. Therefore, the memory 5 stores all the voltages that have been periodically detected by the voltage detector 3.

The presently detected voltage which is stored in the memory 5 is supplied to a comparator 6. In the initial charging stage, the comparator 6 is also supplied with the previously detected voltage from the memory 5. The comparator 6 therefore detects whether the presently detected voltage has increased or decreased over the value of the previously detected voltage. Based on the detected change in the voltage across the battery 2, a battery detector 7 determines whether the battery 2 is a long storage battery or a frequently used battery. The battery detector 7 applies its output signal to a current controller 8 to control the charging current which is being supplied to the battery 2.

The operation of the battery charger shown in FIG. 3 will be described below with reference to the sequence shown in FIG. 4.

Figure 4:
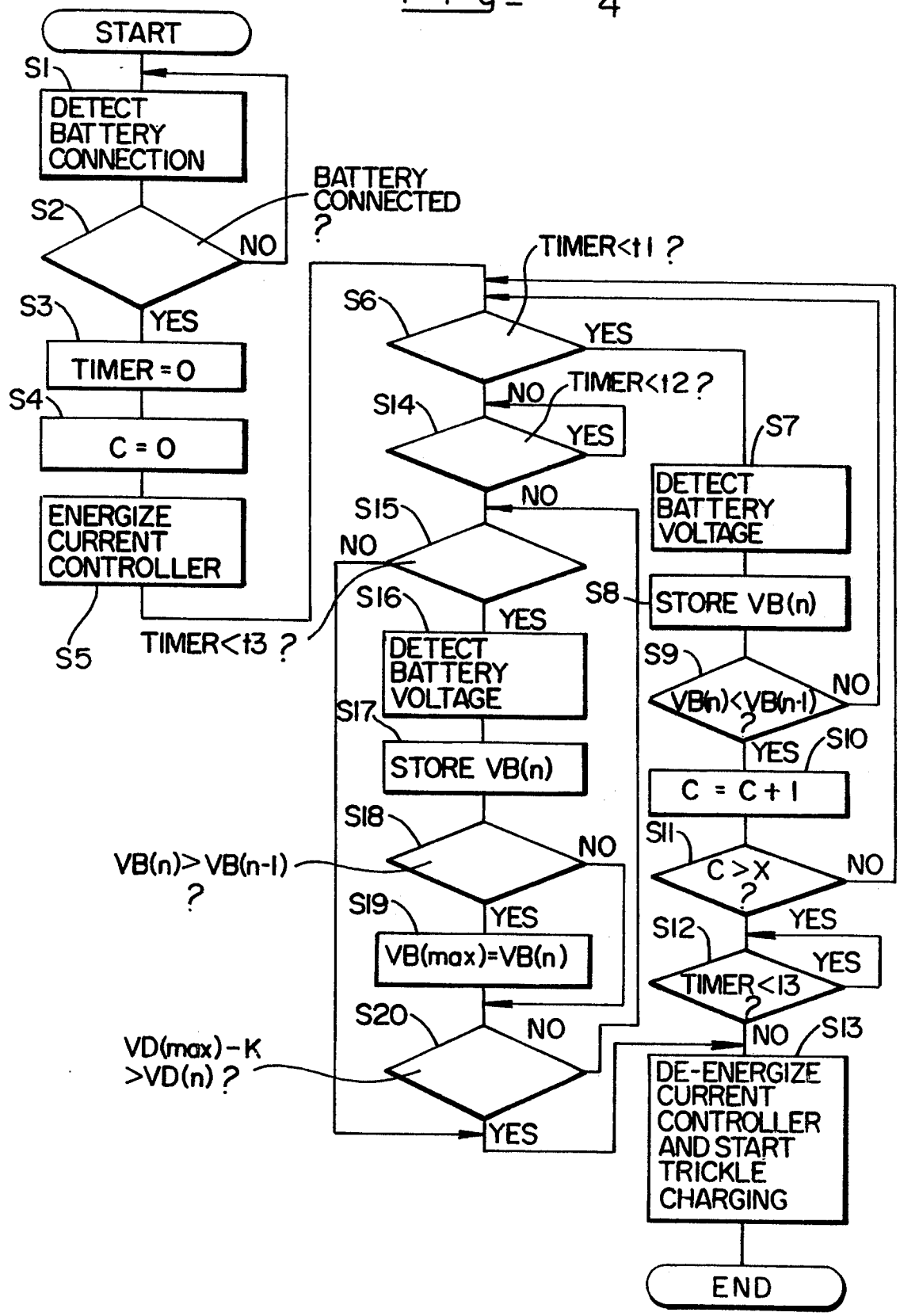
FIG. 4 is a flowchart of a sequence of charging a battery with the battery charger shown in FIG. 3.

As shown in FIG. 4, steps S1, S2 determine whether a battery 2 is connected to the battery charger. These steps are continuously repeated until it is detected that a battery is connected to the battery charger. If a battery, such as a nickel-cadmium battery, is connected to the battery charger, the timer 4 is reset to "0" in step S3, and count C of counter 4a is reset to "0" in step S4. In step S5, the current controller 8 is energized to supply a charging current from the power supply 1 to quick charge the battery 2.

The timer 4 measures time, and determines whether the time that has elapsed is less than a predetermined time t1 (see FIG. 2) in step S6. If the time that has elapsed is less than t1, the voltage is detected in step S7. The voltage is then stored in the memory 5 in step S8. The present voltage VB(n) is then compared with the previously detected voltage VB(n−1) in step S9.

If VB(n) is less than VB(n−1), the routine goes to step S10 and the counter C is incremented by 1. If VB(n) is greater than VB(n−1), the routine goes to step S6 and is thus repeated.

After C has been incremented in step 10, it is compared to a predetermined value X in step S11. If C is greater than X, the routine goes to step S12, where it loops until the elapsed time is greater than time t3. If C is less than X, the routine repeatedly executes step S12 the process repeated.

When the elapsed time is greater than t3, the routine goes to step 13, where the current controller is de-energized and the routine is ended.

FIG. 2 shows the charging profile for a long storage battery (A), and a frequently used battery (B). These charging profiles were compiled after extensive testing of the two types of batteries. Thus, for a long storage battery, the voltage across its terminals drops continuously from time t0 to time t1. However for a frequently used battery, the voltage drops slightly and then starts to rise, such that at time t1, the voltage across the terminals is almost the same as at time t0.

Therefore, as shown by the flowchart of FIG. 4, a long storage battery will repeat steps S6 through S11 until count C exceeds the predetermined value X. This will happen before time t1 has elapsed. Then, the routine will repeat step S12 until time t3 has elapsed, at which time the current controller will be de-energized.

For a frequently used battery, step S6 through S11 will be repeated until the voltage VB stops decreasing and afterwards, steps S6 through S9 will be repeated until the elapsed time exceeds t1. At this point the routine goes to step 14.

Figure 1:
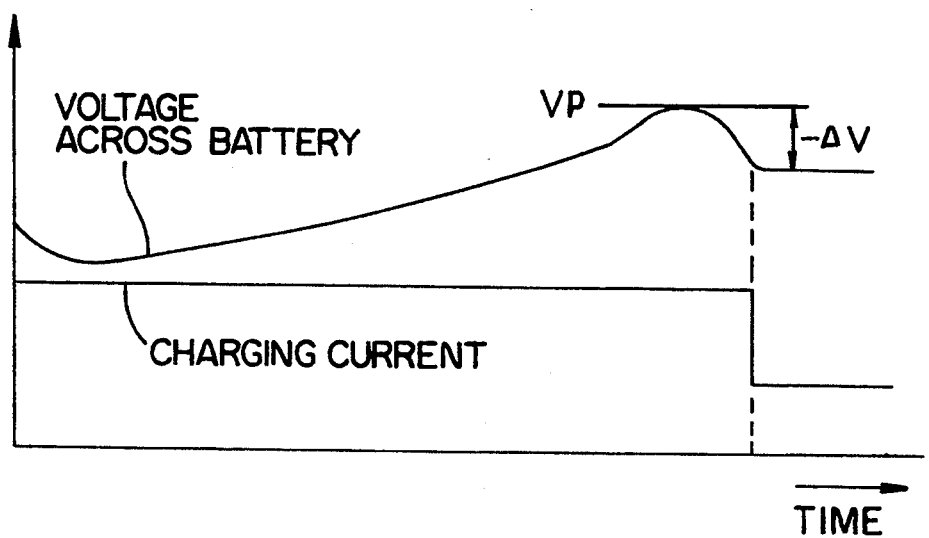
FIG. 1 is a diagram showing the principles of detecting a voltage drop subsequent to a voltage peak to cut off a charging current supplied to charge a battery.

At step 14 the elapsed time is compared with a predetermined time t2. If the elapsed time is less than t2, the routine repeats S14, effectively waiting for period of time equal to t2 to elapse. When the elapsed time exceeds t2, the routine goes to step S15. The time t2 is the time required for both curves A and B shown in FIG. 1 to become increasing curves (i.e., having a positive slope). Step S15 compares the elapsed time to a predetermined time t3. If the elapsed time exceeds t3, the routine goes to step S13, where the current controller is de-energized. Time t3 represents the predetermined charging time for a quick charging mode. A trickle-charge mode starts after the quick charging mode has finished. The trickle-charge mode is optional and is not necessarily used. After trickle-charging is completed the routine is ended.

The subsequent steps describe the $-\Delta V$ detecting method and is a well known detecting method.

If the elapsed time is less than t3, the routine goes to step S16, where the battery voltage is detected. The battery voltage VB is stored in the memory 5, at step S17. The voltage VB(n) is compared with the voltage VB(n−1) by the comparator 6 at step S18. If the voltage VB(n) is greater than the voltage VB(n−1), VB(max) is set to VB(n) in step S19. The routine then goes to step S20 where VB(max) minus K is compared with the detected voltage VB(n). The value K corresponds to the voltage drop $-\Delta V$ shown in FIG. 1. If VB(max)−K is greater than VB(n), the current controller is de-energized and trickle-charging is started as described above.

For step S18 above, If VB(n) is not greater than VB(n−1), then the routine goes to step S20. If at step S20 VB(max)−K is not greater than VB(n), then the routine goes to step S15, where the process is repeated.

As described above, a frequently used battery is charged based on the detection of a predetermined voltage drop across the battery. A long storage battery is charged continuously until a maximum rated charging time has elapsed (i.e., time t3) regardless of ally pseudo peak voltage detected across the battery. Therefore, both the frequently used battery and the long storage battery can be fully charged.

The times t1, t2, t3 in the illustrated embodiment may be 1 to 2 minutes, 3 to 5 minutes, and 80 minutes. respectively. The predetermined voltage K, which is a voltage drop ranging from 8 to 12 mV/cell, may be set to a suitable value. However, if the predetermined voltage K is set too high, the end of the charging process would be detected too late, and the battery would be excessively charged.

Conversely, if the predetermined voltage K is set too low, the end of the charging process would be detected based on a small voltage fluctuation in the final stage of the charging process, with the result that the battery would not be fully charged.

The present disclosure relates to subject matter contained in Japanese Patent Application No. HEI 4-212329, filed on Jul. 17, 1992, which is expressly incorporated herein by reference in its entirety.

What is claimed is:

1. A battery charger for charging a battery, comprising:
   means for detecting a voltage across said battery;
   means for determining whether said battery is a frequently used battery or a long storage battery, based upon a variation in said voltage detected by said detector means during a first predetermined time period after said battery starts charging; and
   means for charging said battery with a first predetermined charging routine if said battery is determined to be a frequently used battery by said determining means, and for charging said battery with a second predetermined charging routine if said battery is determined to be a long storage battery by said determining means.

2. The battery charger of claim 1, wherein said detector means periodically detects said voltage across said battery.

3. The battery charger of claim 2, wherein said determining comprises:
   means for storing voltages detected by said detecting means; and
   means for comparing said voltage detected by said detecting means with a previously detected voltage stored in said storing means.

4. The battery charger of claim 3, further comprising:
   means for measuring an elapsed time; and
   means for incrementing a counting variable if said voltage detected by said detecting means has decreased relative to the previously detected voltage stored in said storing means.

5. The battery charger of claim 4, wherein said determining means determines that said battery is a long storage battery if said counting variable exceeds a predetermined value before said first predetermined time period elapses.

6. The battery charger of claim 4, wherein said determining means determines that said battery is a frequently used battery if said counting variable fails to exceed a predetermined value before said first predetermined time period elapses.

7. The battery charger of claim 6, wherein said storing means stores a maximum voltage detected by said detecting means after said first predetermined time period elapses.

8. The battery charger of claim 7, wherein said charging means stops charging said battery when said voltage detected by said detecting means has decreased by a certain voltage value relative to said maximum voltage.

9. The battery charger of claim 5, wherein said charging means charges said battery until a second predetermined time period elapses after said first predetermined time period elapses.

10. The battery charger of claim 1, wherein said first predetermined charging routine charges said battery with a constant current until said voltage detected by said detecting means decreases by a predetermined voltage after a maximum voltage has been detected by said detecting means.

11. The battery charger of claim 1, wherein said second predetermined charging routine charges said battery with a constant current until a second predetermined time period has elapsed.

* * * * *